United States Patent
Campagnolo

(10) Patent No.: US 6,694,845 B2
(45) Date of Patent: Feb. 24, 2004

(54) BICYCLE PEDAL WITH INCORPORATED MAGNET FOR ACTIVATING A SENSOR

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/546,676

(22) Filed: Apr. 11, 2000

(65) Prior Publication Data

US 2002/0108466 A1 Aug. 15, 2002

(30) Foreign Application Priority Data

Jun. 8, 1999 (IT) .......................... TO99A0488

(51) Int. Cl.7 ................................ G05G 1/14
(52) U.S. Cl. ...................... 74/594.4; 324/174
(58) Field of Search ................ 74/594.4; 324/174, 324/166, 173, 207.25; 73/379.07; 340/432

(56) References Cited

U.S. PATENT DOCUMENTS

| 3,898,563 A | * | 8/1975 | Erisman | 324/166 |
| 4,150,667 A | * | 4/1979 | Takeuchi | |
| 4,331,918 A | * | 5/1982 | Dunch | 324/174 |
| 4,373,760 A | * | 2/1983 | Durham | 384/458 |
| 4,642,606 A | * | 2/1987 | Tsuyama | 340/432 |
| 5,081,883 A | * | 1/1992 | Romano | 74/594.6 |
| 5,089,775 A | * | 2/1992 | Takeda | 324/174 |
| 5,546,829 A | * | 8/1996 | Bryne | 74/594.6 |
| 6,227,071 B1 | * | 5/2001 | Coombe | 74/594.4 |
| 6,341,540 B2 | * | 1/2002 | Steinberg | 74/594.6 |

FOREIGN PATENT DOCUMENTS

JP  8207866  * 8/1996

* cited by examiner

Primary Examiner—David Fenstermacher
(74) Attorney, Agent, or Firm—Volpe and Koenig, P.C.

(57) ABSTRACT

A bicycle pedal, having a pedal shaft which has an end surface in which a blind hole is formed, is provided with a permanent magnet which is designed to interact with a sensor of the pedalling cadence, provided on the frame of the bicycle. The permanent magnet is housed within the blind hole and retained simply by magnetic attraction, if the pedal shaft is made from ferromagnetic material, or, for example, if the pedal shaft is not made from ferromagnetic material, by means of an auxiliary element of ferromagnetic material which is fixed within the aforesaid blind hole and to which the permanent magnet adheres simply by magnetic attraction.

13 Claims, 2 Drawing Sheets

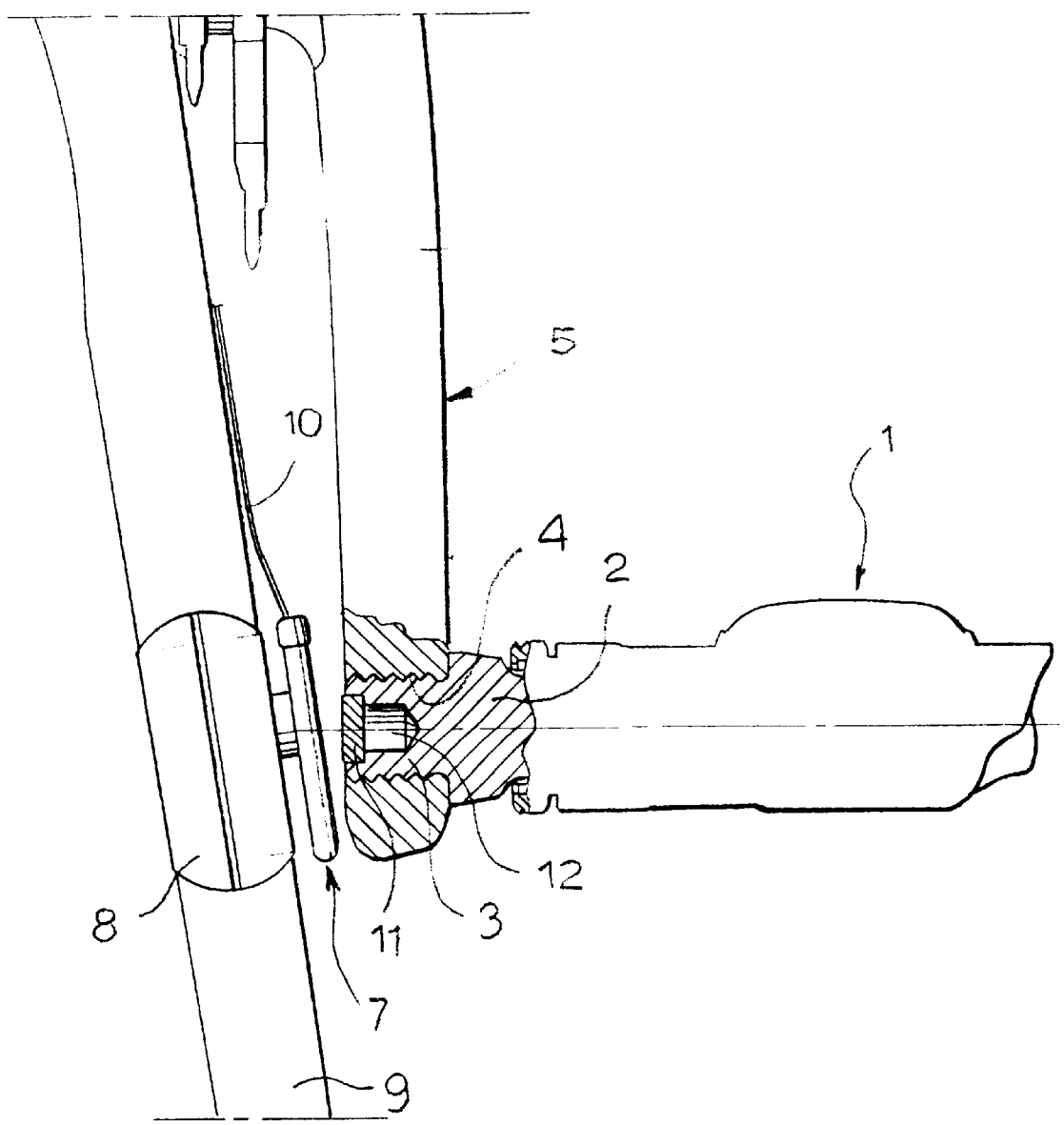
Fig_1

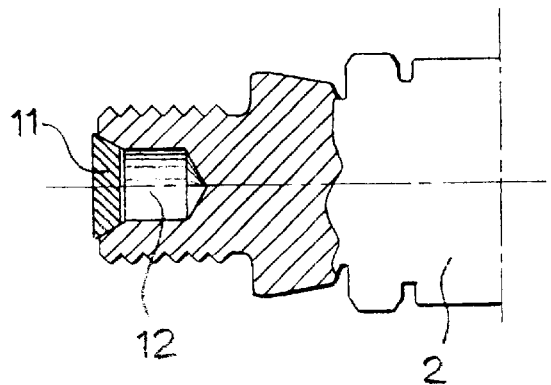
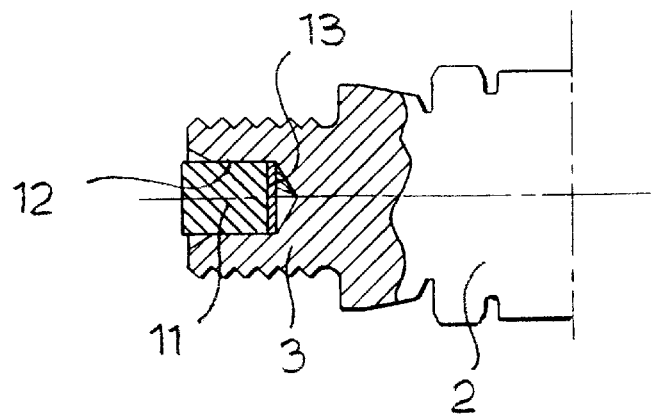
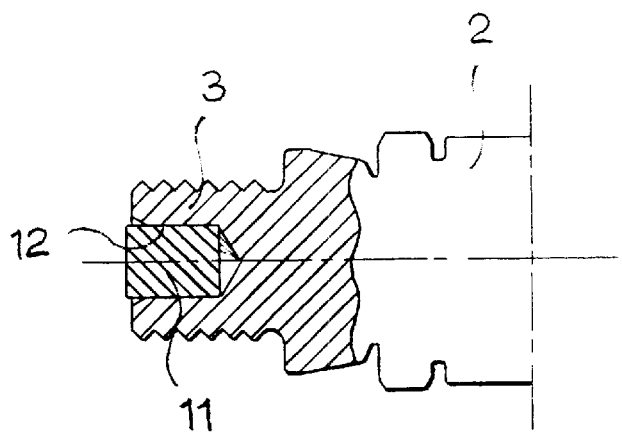

BICYCLE PEDAL WITH INCORPORATED MAGNET FOR ACTIVATING A SENSOR

BACKGROUND OF THE INVENTION

The present invention relates to the field of bicycles, and, in particular, concerns a bicycle pedal provided with a permanent magnet designed to interact with a sensor provided on the frame of the bicycle.

In recent years, there has been a constant increase in the use, on bicycles, of on-board computers associated with a display panel which supplies the cyclist with a set of data, for example the selected gear ratio or the speed of the bicycle. One of the parameters which is displayed from time to time, or which, at least, is used by the computer to calculate further parameters to be displayed, is the pedalling cadence. This parameter is measured by means of a sensor, for example a reed sensor fitted on the bicycle frame adjacent to a pedal crank and interacting with a permanent magnet fitted on the pedal, which activates the sensor whenever it passes in front of it.

According to the prior art, the aforesaid permanent magnet is fixed to the pedal crank by means of a connecting band or other means of connection which in all cases has an undesired bulk, interrupts the visual continuity of the pedal crank and does not provide complete security of the connection.

SUMMARY OF THE INVENTION

In order to overcome these disadvantages, the object of the invention is a bicycle pedal having a pedal shaft, characterized in that the shaft has an end surface in which a hole is formed, and in that a permanent magnet, designed to interact with a sensor provided on the frame of the bicycle, is positioned in the said hole.

It should be noted that the pedal shaft is conventionally provided with a hole, since this is used for the positioning on the lathe of the semi-finished piece from which the shaft is made.

According to the invention, this blind hole is used for the fitting of a permanent magnet, which is thus perfectly integrated in the pedal without any undesired bulk or unattractive appearance.

If the pedal shaft is made from ferromagnetic material, the aforesaid permanent magnet is retained within the aforesaid hole simply by magnetic attraction.

On the other hand, if the pedal shaft is made from a non-ferromagnetic material, for example titanium alloy, the permanent magnet can be fixed within the blind hole by any connecting means, but preferably it is held against an auxiliary element of ferromagnetic material which is secured within the hole, by being driven in for example.

Clearly, it is possible to provide for the sale of a kit of accessories for fitting an on-board computer and its accessories, including the pedalling cadence sensor, to a bicycle which initially does not have one. In this case, the aforesaid kit of accessories can be made to include a permanent magnet designed to be associated with the bicycle pedal and to interact with the aforesaid sensor provided on the frame, this magnet being shaped so that it can be housed within a hole provided on an end surface of the pedal shaft, as described above.

BRIEF DESCRIPTION OF THE DRAWINGS

Further characteristics and advantages of the invention will be made clear by the following description with reference to the attached drawings, provided purely by way of example and without restrictive intent, in which:

FIG. 1 is a view in partial cross section of a bicycle pedal and of the corresponding crank, and also of part of the bicycle frame adjacent to this pedal crank, the pedal being made according to the teachings of the present invention, and FIGS. 2–4 illustrate variants of the detail shown in cross section in FIG. 1.

DETAILED DESCRIPTION OF THE DRAWINGS

With reference to FIG. 1, the reference number 1 indicates as a whole a bicycle pedal fitted rotatably by means of roller bearings (not shown) on a pedal shaft 2 made, for example, from steel or from light alloy, for example a titanium-based alloy. The pedal shaft 2 has a threaded end portion 3 which is housed and fixed by screwing within a threaded hole 4 of a pedal crank 5 designed to be connected with respect to rotation, in a known way, to the central shaft of the bicycle designed to be engaged selectively with the bicycle chain. These constructional details are not described or illustrated here, since they can be made in any way and do not fall within the scope of the invention.

The reference number 7 indicates a sensor of the reed type fitted by means of a band 8 on one of the two arms 9 of the rear wheel fork of the bicycle. The sensor 7 is connected, for example by an electrical cable 10 (or by a cordless link) to an on-board computer of the bicycle (not shown) in order to send it a signal whenever a permanent magnet 11, secured to the shaft 2 of the pedal, passes in front of it.

In the embodiment illustrated in FIG. 1, the permanent magnet 11 consists of a cylindrical disc which is housed in a mouth of enlarged diameter of a blind hole 12 formed from the end surface of the pedal shaft 2. The hole 12 is conventionally present in the pedal shaft of every pedal of a conventional type, since it is used for the rotatable mounting on the lathe of the semi-finished piece from which the shaft 2 is made. According to the invention, the aforesaid blind hole 12 is used as the seat of the aforesaid permanent magnet 11, which is thus perfectly integrated in the pedal, without the need to use supplementary connecting means which would be bulky and unattractive. If the pedal shaft is made from ferromagnetic material, the magnet 11 is retained in its seat simply by magnetism, and therefore its fitting to the pedal is immediate and extremely easy. FIG. 1 shows the case in which the magnet 11 has a cylindrical shape, while FIG. 2 shows a variant in which the magnet has a conical shape so that it can be matched to the flared shape of the mouth of the blind hole 12. FIG. 4 shows a further variant in which the permanent magnet occupies most of the blind hole 12 and has a more elongate shape. Finally, FIG. 3 relates to the case in which the pedal shaft 2 is made from non-ferromagnetic material, for example titanium-based alloy. In this case, a steel disc 13, to which the permanent magnet 11 subsequently adheres by magnetism, is driven into the bottom of the hole 12.

Clearly, if for any reason the pedal shaft 2 does not have a hole of the type shown as hole 12 in the drawings, this hole must first be formed in the body of the pedal shaft, in order that the magnet can be housed therein.

Naturally, provided that the principle of the invention remains unchanged, the details of construction and the forms of embodiment can be varied widely from what has been described and illustrated purely by way of example, without departing thereby from the scope of the present invention.

What is claimed is:

1. A bicycle pedal for use in connection with a bicycle pedal cadence detection system having a sensor located on the bicycle and within a range defined by a pedal crank, the pedal comprising:
   a) a shaft having a connecting end portion to be connected to the pedal crank,
   b) a bore wholly defined within the connecting end portion of the shaft; and
   c) a magnetic element secured wholly within the bore.

2. The pedal of claim 1, wherein the magnetic element is concealed within the bore.

3. The pedal of claim 1, wherein the bore is centered axially on the shaft.

4. The pedal of claim 1 wherein the magnetic element is secured in the bore by a ferromagnetic material.

5. The pedal of claim 1 wherein the magnetic element is a single magnet.

6. A bicycle pedal comprising:
   a) a shaft having a connecting end portion to be connected to a pedal crank associated with the bicycle,
   b) a bore wholly defined within the connecting end portion of the shaft; and
   c) a magnetic element secured wholly within the bore.

7. A bicycle pedal cadence detection system having a sensor located on a bicycle frame and within an active field circumscribed by a pedal connected to a pedal crank the cadence detection system comprising:
   a sensor attached to the bicycle frame at a predetermined location; and
   a pedal comprising:
      a) a shaft having a connecting end portion to be connected to the pedal crank;
      b) a bore defined in the connecting end portion of the shaft; and
      c) a magnetic element secured entirely within the bore;
   whereby the magnetic element cooperate to detect pedal cadence.

8. The pedal of claim 7, wherein the magnetic element is concealed within the bore.

9. The system of claim 7, wherein the bore is centered axially to the shaft.

10. The system of claim 7 wherein the magnetic element is secured in the bore by a ferromagnetic material.

11. The system of claim 7 wherein the magnetic pedal element is a single magnet.

12. A bicycle pedal comprising:
   a shaft having a connecting end portion to be connected to a pedal crank;
   a bore defined in the connecting end portion of the shaft; and
   a magnetic element secured in the bore.

13. The pedal of claim 12 wherein the magnet is wholly within the bore.

* * * * *